United States Patent

[11] 3,576,505

[72] Inventor Harold Seidel
Warren, N.J.

[21] Appl. No. 869,606
[22] Filed Oct. 27, 1969
[45] Patented Apr. 27, 1971
[73] Assignee Bell Telephone Laboratories, Incorporated
Murray Hill, N.J.

[54] TRANSFORMER HYBRID COUPLER HAVING ARBITRARY POWER DIVISION RATIO

3 Claims, 5 Drawing Figs.

[52] U.S. Cl. .......... 333/11, 333/24, 336/170, 307/17
[51] Int. Cl. .......... H01p 5/12
[50] Field of Search .......... 333/10, 11, 24

[56] References Cited

UNITED STATES PATENTS

| | | | |
|---|---|---|---|
| 3,296,557 | 1/1967 | Petts et al. | 333/11 |
| 3,358,247 | 12/1967 | Klockow | 333/11X |
| 3,426,298 | 2/1969 | Sontheimer et al. | 333/10 |
| 3,452,300 | 6/1969 | Cappucci et al. | 333/10 |
| 3,484,724 | 12/1969 | Podell | 333/10 |

*Primary Examiner*—Herman Karl Saalbach
*Assistant Examiner*—T. Vezeau
*Attorneys*—R. J. Guenther and Arthur J. Torsiglieri

ABSTRACT: This application describes a transformer hybrid coupler in which the power division ratio can have essentially any arbitrary value. The coupler comprises two quadrifilar coils, each one of which includes two, tightly coupled N:1 transformers. The coils are series connected such that one end of each of the primary windings of one coil is coupled to one end of a different one of the secondary windings of the other coil in a manner such that the network representation of the resulting four-port with respect to the symmetric mode of excitation is the dual of the network representation with respect to the antisymmetric mode of excitation. The other ends of the windings of either one of the coils constitute the four coupler ports, while the other ends of the windings of the other coil are connected to a common junction, typically ground.

PATENTED APR 27 1971 3,576,505

SHEET 1 OF 2

INVENTOR
H. SEIDEL
BY
Sylvan Sherman
ATTORNEY

TRANSFORMER HYBRID COUPLER HAVING ARBITRARY POWER DIVISION RATIO

This invention relates to transformer hybrid couplers having any arbitrary power division ratio.

BACKGROUND OF THE INVENTION

A hybrid junction is a four branch power dividing network in which the branches are arranged in conjugate pairs such that energy coupled to one branch of one pair of conjugate branches is divided between the branches of the second pair of conjugate branches, with essentially none of the energy being coupled to the other branch of the first pair of branches.

Hybrids can be divided into two broad classes. In one class, which includes the so-called "magic tee," the "rat race bridge" and the lower frequency "hybrid transformer," the two output signals are either in phase or 180° out of phase. (For purposes of this application, this class of hybrid shall be referred to hereinafter simply as a "180° hybrid.")

The second class of hybrid junctions, which includes, for example, the Riblet coupler and the multihole directional coupler, are quadrature phase shift devices in that the phase of the two output signal components always differ by 90°.

In general, the power division ratio of the quadrature hybrid is a matter of design. Until recently, however, all 180° hybrids were characterized by power division ratios equal to unity. That is, all 180° hybrids were 3 db. couplers in which the incident power essentially divided equally between the two output branches. Obviously, this characteristic of the 180° hybrid significantly limited its usefulness as a circuit component. For example, it is often desirable to sample the power in a circuit by extracting a small amount, such as 10 percent or less, of the incident power. Clearly a hybrid coupler that extracts half of the power cannot be used for this purpose.

SUMMARY OF THE INVENTION

This application describes a 180° hybrid coupler in which the power division ratio can have essentially any arbitrary value. In accordance with the invention the network comprises two quadrifilar coils, each one of which includes two, tightly coupled N:1 transformers. The coils are series connected such that one end of each of the primary windings of one coil is coupled to one end of a different one of the secondary windings of the other coil in a manner such that the network representation of the resulting four-port with respect to the symmetric mode of excitation is the dual of the network representation with respect to the antisymmetric mode of excitation. In one embodiment of the invention, all of the windings of one coil are connected in the same sense whereas the windings comprising the two transformers of the other coil are connected in the opposite sense. In alternate embodiments of the invention, a primary or a secondary winding in each coil is connected in the opposite sense to the other windings on said coil.

In all of the above-described embodiments the other ends of the windings of either one of the coils constitute the four coupler ports, while the other ends of the windings of the other coil are connected to a common junction, typically ground.

It is an advantage of the invention that the power division ratio is a function solely of the turns ratio N of the transformers and, hence, a 180° hybrid coupler having essentially any arbitrary power division ratio can be realized.

These and other advantages, the nature of the present invention, and its various features, will appear more fully upon consideration of the various illustrative embodiments now to be considered in detail in connection with the accompanying drawings.

BRIEF DESCRIPTION OF THE DRAWINGS

Referring to the drawings, FIG. 1 shows a first embodiment of a hybrid coupler, in accordance with the present invention, comprising two identical, series-connected quadrifilar coils 10 and 11. Advantageously, the windings of each coil are wound on a suitable core, such as ferrite, to produce tight coupling among the four windings of the respective coils. A signal source 20 is typically connected to one of the coupler ports *a*. The other ports, *b*, *c* and *d*, are connected to load circuits represented by terminating impedances 21, 22 and 23.

Figure 1:
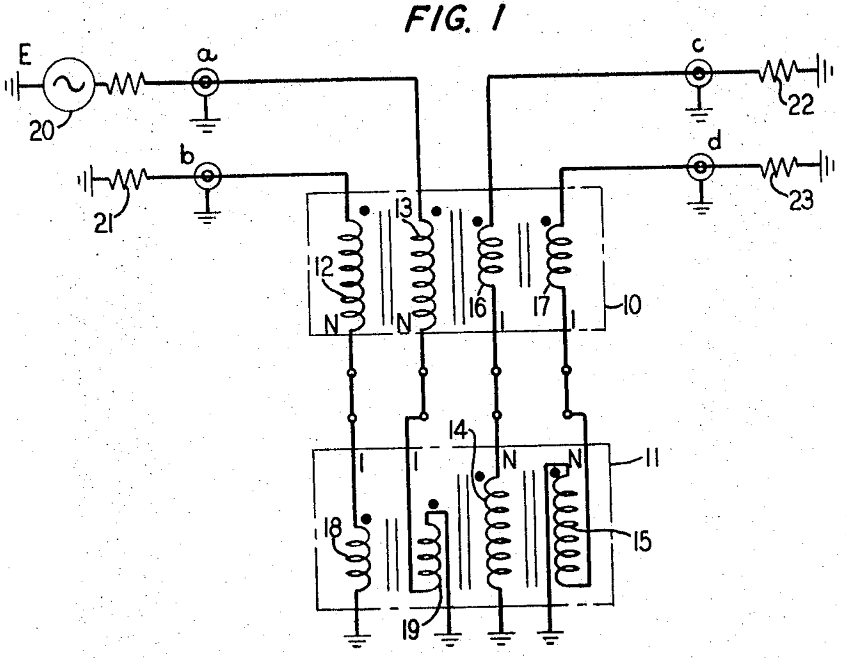
FIG. 1 shows a first embodiment of a transformer hybrid coupler in accordance with the present invention.

The four windings on each coil can be considered as comprising two N:1 transformers, where Nis a rational number greater than one. For purposes of explanation, coils 12, 13, 14 and 15, having the larger number of turns, are arbitrarily designated the primary windings, and coils 16, 17, 18 and 19, having the smaller number of turns, are designated the secondary windings. So designated, the coupler is formed by connecting the primary windings of each coil in series with the secondary windings of the other coil. In addition, the windings of coil 10 are connected in the same sense, i.e., the magnetic field produced by the respective windings are additive when the windings are energized in phase. The windings on coil 11, on the other hand, are connected such that the windings forming the two transformers are connected in the opposite sense, i.e., the magnetic fields produced by the windings comprising one transformer are opposite to the magnetic fields produced by the windings of the other transformer where the four windings are energized in phase. Thus, primary windings 12 and 13 of coil 10 are connected in series, respectively, with secondary windings 18 and 19 of coil 11, and secondary windings 16 and 17 of coil 10 are connected in series, respectively, with primary windings 14 and 15 of coil 11. With the sense of the respective windings indicated by the dot at one end thereof, the windings of coil 10 are connected in the same sense by connecting them to coil 11 at their same respective ends. The transformers of coil 11 are connected in the opposite sense by connecting primary windings 12 and 13 to opposite ends of secondary windings 18 and 19 and, similarly, by connecting secondary windings 16 and 17 to opposite ends of primary windings 14 and 15.

The other ends of windings 14, 15, 18 and 19 are all grounded while the other ends of coils 13, 12, 16 and 17 constitute the four coupler ports *a*, *b*, *c*, and *d*.

The operation of the hybrid coupler herein described is conveniently analyzed by separately examining its response to the symmetric mode of excitation and to the antisymmetric mode of excitation, and then superimposing the two results. This is now done referring to FIGS. 2A and 2B which show the four-port excited in the symmetric and antisymmetric modes, respectively.

Figure 2A:
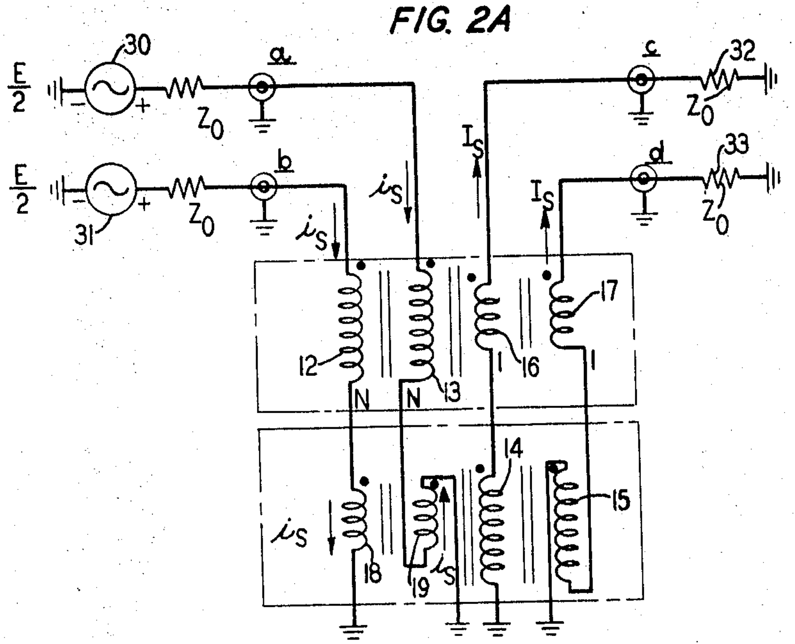
FIGS. 2A and 2B, included for purposes of explanation, show the embodiment of FIG. 1 excited in the symmetric and antisymmetric modes, respectfully.

Referring more specifically to FIG. 2A, signal sources 30 and 31 of amplitude E/2 and output impedance $Z_0$ excite ports *a* and *b* in phase. These produce in-phase currents $i_s$ which flow through series-connected windings 12—18 and 13—19. As indicated hereinabove, windings 12 and 13 are connected in the same sense so that the magnetic fields produced by currents $i_s$ are additive and, hence, there is magnetic coupling between windings 12—13 and 16—17. The resulting currents $I_s$ induced in the latter windings are similarly equal in amplitude and in phase.

Windings 18 and 19, on the other hand, are connected in the opposite sense and, therefore, there is no net magnetic field produced and no coupling between windings 18—19 and 14—15. Thus, with respect to the symmetric mode of excitation, the network appears as an N:1 transformer.

Figure 2B:
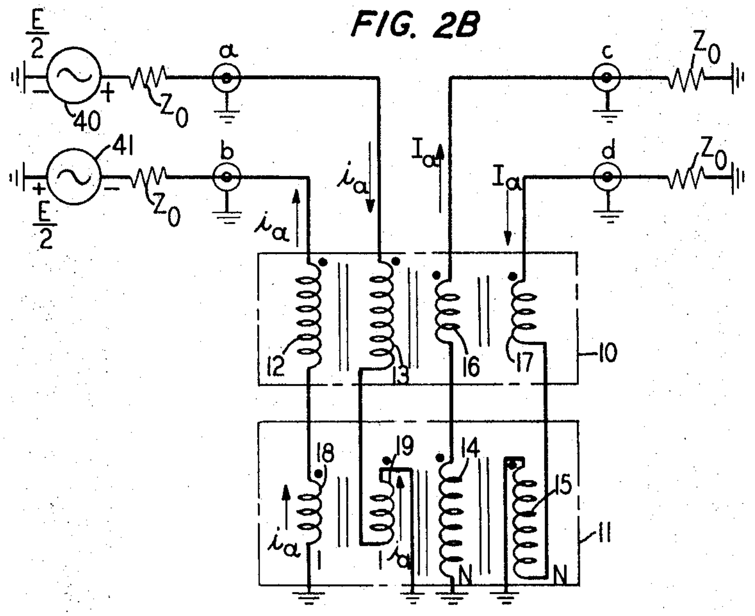

In FIG. 2B, coupler ports *a* and *b* are shown excited in the antisymmetric mode by means of two equal amplitude, 180° out of phase signal sources 40 and 41. These produce out of phase currents $i_a$ which produce no net magnetic coupling between windings 12—13 and 16—17. However, because of the opposite sense of the windings on coil 11, there is coupling between windings 18—19 and 14—15. The resulting currents $I_a$ induced thereby are equal in amplitude and 180° out of phase. Thus, with respect to the antisymmetric mode of excitation, the network appears as a 1:N transformer, which is the network dual of the symmetric mode response.

Applying the principle of superposition to both the inputs and outputs, the symmetric and antisymmetric signals applied to port *a* sum to E, whereas the signals applied to port *b* sum to zero, thus simulating the excitation conditions shown in FIG. 1, wherein a signal source 20 is coupled to port a. In addition, since it is known that for dual networks the coefficient of transmission $t_s$ between input ports *a* and *b* and output ports *c* and *d* for the symmetric mode of excitation is equal to the coefficient of transmission $t_a$ between said ports for the antisymmetric mode of excitation, it follows that $|I_s| = |I_a|$. Thus, the currents for the two modes, being in phase at port *c*, add constructively, whereas the currents at port *d* sum to zero. It will also be noted that since all the ports are terminated by the same impedance $Z_o$, the network is mismatched. There is, accordingly, a reflected component of current associated with each of the two modal excitations. Since the network is bidual, the coefficient of reflection $k_s$ for the symmetric mode and the coefficient of reflection $k_a$ for the antisymmetric mode are related by $k_a = -k_s$. As such, the symmetric and antisymmetric reflected components of current sum to zero in port *a* and add constructively in port *b*.

From the above discussion it is seen that a signal applied to port *a* is divided by the coupler into components. One component is transmitted to port *c;* the other component is reflected to port *b*. The coefficient of transmission $t=t_a=t_s$ and the coefficient of reflection $k=k_s=-k$for the network are given, in terms of the turns ratio N, by $$t=\frac{2N}{N^2+1} \quad (1)$$

and $$k=\frac{N^2-1}{N^2+1} \quad (2)$$

The power division ratio P is then $$P=\frac{4N^2}{(N^2-1)^2} \quad (3)$$

Thus, by the appropriate selection of the turns ratio N, a coupler having essentially any arbitrary power division ratio can be devised.

It will be noted that in the embodiment of FIG. 1, the connections to coils 10 and 11 are different. This means either that coils 10 and 11 can be identical internally, and that the relative sense of the windings is determined by the external connections. On the other hand, the sense of the windings can be determined by the internal connections, in which case coils 10 and 11 are no longer identical.

Figure 3:
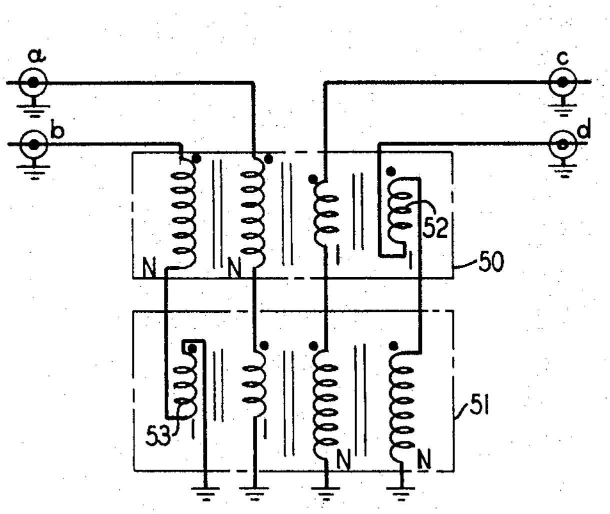
FIGS. 3 and 4 show alternate embodiments of the invention.
Figure 4:
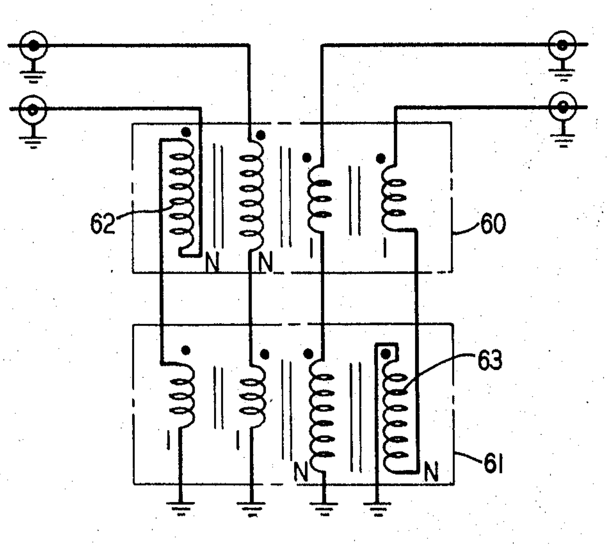

FIGS. 3 and 4 are alternative embodiments of a coupler in accordance with the present invention comprising two identical coils in which the sense of the windings is nevertheless determined by the internal connections. In the embodiment of FIG. 3, for example, the two coils 50 and 51 are identical, each having one secondary winding 52 and 53 internally connected in the opposite sense to the other windings. Similarly, in the embodiment of FIG. 4 both coils 60 and 61 are identical, with each of the two coils 60 and 61 having one primary winding 62 and 63 internally connected in the opposite sense to the other windings.

It is apparent from the above discussion that the windings of the two coils can be connected in a variety of ways without destroying the bidual nature of the network. Thus, the above-described arrangements are illustrative of only a small number of the many possible embodiments which can represent applications of the principles of the invention. Numerous and various other arrangements can readily be devised by those skilled in the art without departing from the spirit and scope of the invention.

I claim:

1. A hybrid coupler comprising:

two quadrifilar coils, each of which comprise two, tightly coupled N:1 transformers;

one end of each primary windings of each of said coils being connected to one end of a different one of the secondary windings of the other of said coils;

the other ends of the windings of one of said coils being the four ports of said coupler;

the other ends of the windings of the other of said coils being connected to a common junction; characterized in that:

the windings are connected such that the network representations corresponding to the symmetric and antisymmetric modes of excitation are bidual.

2. The coupler according to claim 1 wherein all the windings of one of said coils are connected in the same sense; and wherein the windings of the two transformers of the other of said coils are connected in the opposite sense.

3. The coupler according to claim 1 wherein three corresponding windings of both of said coils are connected in the same sense; and wherein the fourth winding of both of said coils are connected in the opposite sense.